US008862696B2

(12) United States Patent
Andreasson

(10) Patent No.: US 8,862,696 B2
(45) Date of Patent: Oct. 14, 2014

(54) INTERCONNECTING APPLICATIONS ON PERSONAL COMPUTERS AND MOBILE TERMINALS THROUGH A WEB SERVER

(75) Inventor: Mans Folke Markus Andreasson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 416 days.

(21) Appl. No.: 12/555,132

(22) Filed: Sep. 8, 2009

(65) Prior Publication Data

US 2011/0061000 A1    Mar. 10, 2011

(51) Int. Cl.
| | |
|---|---|
| G06F 15/16 | (2006.01) |
| H04L 29/08 | (2006.01) |
| G06F 21/43 | (2013.01) |
| H04W 76/02 | (2009.01) |
| H04W 8/26 | (2009.01) |

(52) U.S. Cl.
CPC ............. *G06F 21/43* (2013.01); *H04W 76/021* (2013.01); *H04W 8/26* (2013.01); *H04L 67/14* (2013.01); *H04L 67/2838* (2013.01); *H04L 67/2833* (2013.01); *H04L 67/146* (2013.01); *H04W 76/02* (2013.01)
USPC ............................ 709/218; 709/227; 709/228

(58) Field of Classification Search
USPC ......................................................... 709/218
See application file for complete search history.

(56) References Cited

U.S. PATENT DOCUMENTS

| | | | |
|---|---|---|---|
| 5,884,312 A * | 3/1999 | Dustan et al. ......................... | 1/1 |
| 7,337,434 B2 | 2/2008 | Nichols et al. | |
| 2002/0007460 A1 * | 1/2002 | Azuma ........................ | 713/201 |
| 2002/0083044 A1 * | 6/2002 | Kaplan ............................ | 707/1 |
| 2002/0100798 A1 | 8/2002 | Farrugia et al. | |
| 2005/0073982 A1 * | 4/2005 | Corneille et al. ............. | 370/338 |
| 2006/0149414 A1 * | 7/2006 | Archacki et al. ............. | 700/227 |
| 2006/0212587 A1 * | 9/2006 | Barsuk .......................... | 709/228 |

(Continued)

FOREIGN PATENT DOCUMENTS

| | | | | |
|---|---|---|---|---|
| CL | WO 03/065676 A1 * | 8/2003 | ............. | H04L 29/06 |
| EP | 1 914 657 A2 | 4/2008 | | |
| WO | WO 03/065676 A1 | 8/2003 | | |

OTHER PUBLICATIONS

Phan, T.; Kaixin Xu; Guy, R.; Bagrodia, R., "Handoff of application sessions across time and space," Communications, 2001. ICC 2001. IEEE International Conference on , vol. 5, no., pp. 1367,1372 vol. 5, 2001.*

(Continued)

*Primary Examiner* — Taylor Elfervig
(74) *Attorney, Agent, or Firm* — Myers Bigel Sibley & Sajovec, P.A.

(57) ABSTRACT

Methods of communicatively connecting a local application on a mobile terminal to a Web application on a personal computer and related Web servers and mobile terminals are disclosed. A first session ID for the Web application and a corresponding first code may be communicated from a connector application on a Web server to the personal computer. A second code and user ID may be communicated from the mobile terminal to the connector application on the Web server. The connector application on the Web server may be operated to determine whether the first code from the personal computer matches the second code from the mobile terminal and, if so, to communicatively connect the local application on the mobile terminal to the Web application on the personal computer.

14 Claims, 9 Drawing Sheets

(56) References Cited

U.S. PATENT DOCUMENTS

| | | | |
|---|---|---|---|
| 2007/0077916 A1* | 4/2007 | Saito | 455/411 |
| 2007/0094490 A1* | 4/2007 | Lohr | 713/153 |
| 2007/0136573 A1 | 6/2007 | Steinberg | |
| 2008/0034111 A1* | 2/2008 | Kamath et al. | 709/238 |
| 2008/0034119 A1* | 2/2008 | Verzunov et al. | 709/247 |
| 2008/0034410 A1* | 2/2008 | Udupa et al. | 726/5 |
| 2009/0327310 A1* | 12/2009 | Bengtsson et al. | 707/10 |
| 2010/0070635 A1* | 3/2010 | Bengtsson | 709/228 |

OTHER PUBLICATIONS

Cherkasova, L.; Phaal, P., "Peak load management for commercial Web servers using adaptive session-based admission control," System Sciences, 2001. Proceedings of the 34th Annual Hawaii International Conference on , vol., no., pp. 10 pp.,, Jan. 3-6, 2001.*

Yaya Wei; Chuang Lin; Fengyuan Ren; Dutkiewicz, E.; Raad, R., "Session based differentiated quality of service admission control for Web servers," Computer Networks and Mobile Computing, 2003. ICCNMC 2003. 2003 International Conference on , vol., no., pp. 112,116, Oct. 20-23, 2003.*

Notification of Transmittal of the International Search Report and the Written Opinion of the International Searching Authority, or the Declaration, International Search Report, Written Opinion of the International Searching Authority, PCT/IB2010/050999, Jul. 21, 2010.

Chinese Office Action Corresponding to Chinese Patent Application No. 201080039820.1; Date of Issuance: Feb. 8, 2014; Foreign Text, 8 Pages, English Translation Thereof, 10 Pages.

* cited by examiner

INTERCONNECTING APPLICATIONS ON PERSONAL COMPUTERS AND MOBILE TERMINALS THROUGH A WEB SERVER

FIELD OF THE INVENTION

The present invention relates to the field of communications in general, and, more particularly, to communicatively connecting applications on personal computers to applications on mobile terminals.

BACKGROUND OF THE INVENTION

The introduction of enhanced data capabilities for wireless networks has resulted in an explosion of wireless applications for users of mobile terminal such as cell phones, Personal Digital Assistants (PDAs), laptop computers, etc. Mobile terminal users are now able to browse Web pages, compose and read e-mail messages, chat with their friends and acquaintances, download music and/or video files from Internet servers, and send digital photographs or images to their friends.

Consequently, cell phones and other mobile terminals are being challenged to provide increased functionality in a diminutive physical package that constrains not only the size and shape of the display, keyboard, and other user interfaces and challenged to provide interconnectivity to a myriad of other devices.

SUMMARY OF THE INVENTION

Some embodiments of the present invention are directed to a method of communicatively connecting a local application on a mobile terminal to a Web application on a personal computer. A first session ID for the Web application and a corresponding first code are communicated from a connector application on a Web server to the personal computer. A second code and a user ID are communicated from the mobile terminal to the connector application on the Web server. The connector application on the Web server is operated to determine whether the first code from the personal computer matches the second code from the mobile terminal and, if so, to communicatively connect the local application on the mobile terminal to the Web application on the personal computer.

In some further embodiments, the local application on the mobile terminal is communicatively connected to the Web application on the personal computer by operating the connector application on the Web server to forward data requests and data responses that are received from the Web application on the personal computer to the local application on the mobile terminal and to forward data requests and data responses that are received from the local application on the mobile terminal to the Web application on the personal computer.

In some further embodiments, the local application on the mobile terminal is communicatively connected to the Web application on the personal computer by operating a connector application on the personal computer to forward data requests and data responses generated by the Web application on the personal computer to the connector application on the Web server and operating a connector application on the mobile terminal to forward data requests and data responses generated by the local application on the personal computer to the connector application on the Web server.

In some further embodiments, a first session ID for the Web application and a corresponding first code are communicated from a connector application on a Web server to the personal computer by responding to a user selection, via the personal computer, of a connector application that is associated with the Web application by operating the personal computer request communication of the first session ID and the first code from the connector application on the Web server and to display the received to a user. A second code and user ID are communicated from the mobile terminal to the connector application on the Web server by operating a connector application on the mobile terminal to receive the first code manually entered by the user through a user interface on the mobile terminal and to respond thereto by communicating the code entered by the user as the second code along with the user ID to the connector application on the Web server.

In some further embodiments, the connector application on the Web server is operated to respond to its determination that the first code from the personal computer matches the second code from the mobile terminal by assigning and communicating a second session ID to the local application on the mobile terminal and by locally associating together the first session ID and the second session ID.

In some further embodiments, the connector application on the Web server is operated to respond to a data request and/or a data response received from the personal computer that contains the first session ID by identifying the correlation of the first session ID to the second session ID and by responding to the identification by forwarding the received data request and/or data response to the local application on the mobile terminal.

In some further embodiments, the connector application is operated on the personal computer to respond to a first data request from the Web application by communicating the first data request and the first session ID, which identifies a source of the first data request, to the connector application on the Web server. The connector application on the Web server is operated to respond to the first data request and the first session ID received from the personal computer by identifying the correlation of the first session ID to the second session ID and by responding to the identification by forwarding the first data request and the second session ID to the mobile terminal. The connector application is operated on the mobile terminal to respond to the first data request and the second session ID received from the Web server by communicating the first data request to the local application.

In some further embodiments, the connector application is operated on the mobile terminal to respond to a first data response from the local application, which is generated in response to the first data request, by communicating the first data response and the second session ID, which identifies a source of the first data response, to the Web server. The connector application is operated on the Web server to respond to the first data response and the second session ID received from the mobile terminal by identifying the correlation of the second session ID to the first session ID and by responding to the identification by forwarding the first data response and the first session ID to the personal computer. The connector application is operated on the personal computer to respond to the first data response and the first session ID received from the Web server by communicating the first data response to the Web application.

In some further embodiments, the method responds to expiration of a threshold elapsed time since when the first data request and the first session ID were forwarded from the personal computer to the Web server and no corresponding data response has been received from the mobile terminal by forwarding a disconnect message and the first session ID to the Web server. The connector application of the Web server is operated to respond to the disconnect message and the first session ID from the personal computer by removing the local association between the first session ID and the second session ID and ceasing to communicatively connect the local application on the mobile terminal to the Web application on the personal computer.

In some further embodiments, the connector application on the mobile terminal is operated to respond to a second data request from the local application by communicating the second data request and the second session ID, which identifies a source of the second data request, to the connector application on the Web server. The connector application on the Web server is operated to respond to the second data request and the second session ID received from the mobile terminal by identifying the correlation of the second session ID to the first session ID and by responding to the identification by forwarding the second data request and the first session ID to the personal computer. The connector application on the personal computer is operated to respond to the second data request and the first session ID received from the Web server by communicating the second data request to the Web application.

In some further embodiments, the connector application on the personal computer is operated to respond to a second data response from the Web application, which is generated in response to the second data request, by communicating the second data response and the first session ID, which identifies a source of the second data response, to the Web server. The connector application on the Web server is operated to respond to the second data response and the first session ID received from the personal computer by identifying the correlation of the first session ID to the second session ID and by responding to the identification by forwarding the second data response and the second session ID to the mobile terminal. The connector application on the mobile terminal is operated to respond to the second data response and second session ID received from the Web server by communicating the second data response to the local application.

In some further embodiments, the method responds to expiration of a threshold elapsed time since when the second data request and the second session ID were forwarded from the mobile terminal to the Web server and no corresponding data response has been received from the personal computer by forwarding a disconnect message and the second session ID to the Web server. The connector application of the Web server responds to the disconnect message and the second session ID from the mobile terminal by removing the local association between the first session ID and the second session ID and ceasing to communicatively connect the local application on the mobile terminal to the Web application on the personal computer.

In some further embodiments, the method responds to a user selection through the personal computer of a connector application link that is displayed by the Web application by downloading a connector application from the Web server and initiating execution of the downloaded connector application. The connector application on the personal computer is operated to request communication of the first session ID and the first code from the connector application on the Web server and to display the received first code to a user.

In some further embodiments, the method responds to a user selection through the mobile terminal of a connector application link that is displayed by the local application by downloading a connector application from the Web server and initiating execution of the downloaded connector application. The connector application on the mobile terminal is operated to receive the first code manually entered by the user through a user interface on the mobile terminal and to respond thereto by communicating the code entered by the user as the second code along with the user ID to the connector application on the Web server.

Some other embodiments the present invention are directed to a Web server that includes a data network interface and a processor circuit. The processor circuit executes a connector application configured to generate a first code and a first session ID for a Web application on a personal computer, to communicate the first code and the first session ID through the data network interface to the personal computer, to receive through the data network interface a second code from a mobile terminal, to determine whether the first code matches the second code and, if so, to forward communications received from a local application on the mobile terminal to the Web application on the personal computer and to forward communications received from the local application on the mobile terminal to the Web application on the personal computer.

In some further embodiments, the processor circuit is further configured to respond to the determination that the first code from the personal computer matches the second code from the mobile terminal by assigning and communicating a second session ID to the local application on the mobile terminal, by locally associating together the first session ID and the second session ID, and by responding to a data request and/or a data response received from the personal computer that contains the first session ID by identifying the correlation of the first session ID to the second session ID and by responding to the identification by forwarding the data request and/or the data response to the local application on the mobile terminal.

In some further embodiments, the processor circuit is further configured to respond to the determination that the first code from the personal computer matches the second code from the mobile terminal by assigning and communicating a second session ID to the local application on the mobile terminal, by locally associating together the first session ID and the second session ID, and by responding to a data request and/or a data response received from the mobile terminal that contains the second session ID by identifying the correlation of the second session ID to the first session ID and by responding to the identification by forwarding the data request and/or the data response to the Web application on the personal computer.

Some other embodiments of the present invention are directed to a mobile terminal that includes a radio transceiver circuit, a user input interface, and a processor circuit. The radio transceiver circuit is configured to communicate with a Web server via a base station transceiver. The processor circuit is configured to execute a connector application to receive a code that is manually entered by a user through the user input interface and to respond thereto by communicating the code along with a user ID to a connector application on the Web server, to respond to a data request and a session ID received from the Web server by outputting the data request to a local application that is executed by the processor, and to respond to receipt of a data response from the local application by outputting the data response and the session ID to the Web server for forwarding to a Web application on a personal computer.

In some further embodiments, the local application executed by the processor circuit is further configured to display a user selectable link for causing connection to the Web application on the personal computer, and to respond to user selection of the link by downloading the connector application from the Web server and by causing execution of the downloaded connector application to initiate communication connectivity between the local application and the Web application through the Web server.

In some further embodiments, the connector application is further configured to respond to expiration of a threshold elapsed time since when the connector application communicated a data request and the session ID to the Web server and no corresponding data response has been received from the personal computer by then communicating a disconnect message to the Web server to cause the Web server to cease communicatively connecting the local application on the mobile terminal to the Web application on the personal computer.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
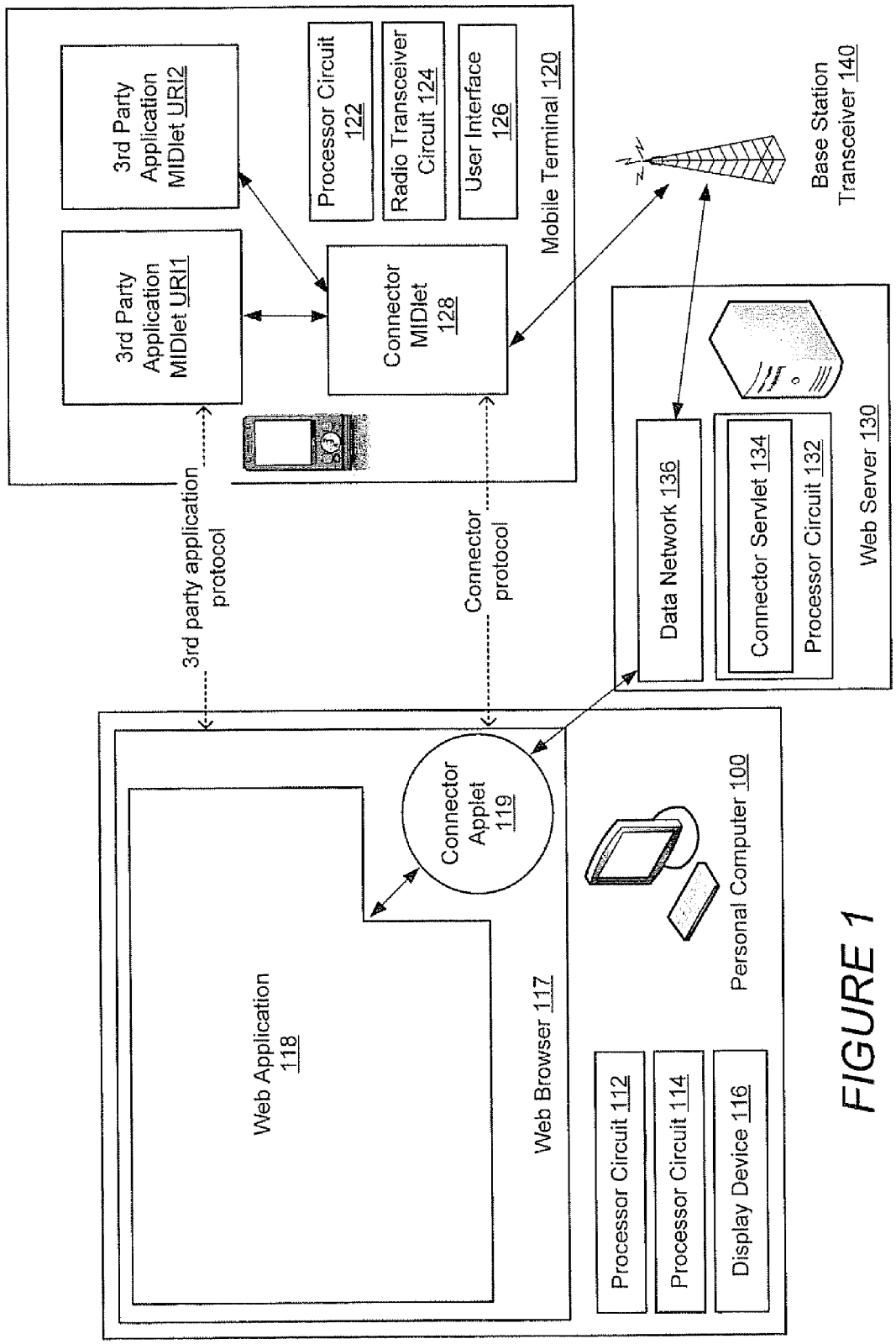
FIG. 1 is a block diagram of a communication system that includes a Web server that communicatively connects a Web application on a personal computer to a third party MIDlet application on a mobile terminal in accordance with some embodiments.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives failing within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another elements, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Various embodiments of the present invention are directed to enabling a user to access various applications on a mobile terminal using a Web browser on a personal computer. In some embodiments, a Web server is configured to communicatively connect a local application on the mobile terminal to a Web browser on the personal computer. The Web server may thereby forward data requests and data responses generated by the Web browser on the personal computer to the local application on the mobile terminal and, similarly, forward data requests and data responses generated by the local application to the Web browser. The personal computer, the Web server, and the mobile terminal can each include a connector application that operates to set up, carry out, and disconnect the communication connectivity between the local application and Web browser. In some embodiments, the personal computer and the mobile terminal can each download their respective connector applications from the Web server, so that the communication connectivity can be provided to conventional personal computers and mobile terminals which were not previously configured to provide such communication connectivity between applications. These and other embodiments will be described below with regard to FIGS. 1-9.

Although various embodiments described in the context of connector applications contain Java Scripts that are executed by a personal computer, a Web server, and a mobile terminal, the invention is not limited thereto and may be embodied in any type of computer executable instructions. Java (Trademark of Sun Microsystems. Inc.) is a full-featured object oriented programming language. Thus, Java programs (applications) are written by creating a structured set of software components that interact with each other to produce the desired effects. These components are called objects, and may be arranged in a hierarchy of object classes, also simply referred to as classes. Instead of running directly on a computer's operating system, Java programs run on a Java Virtual Machine (JVM Trademark of Sun Microsystems, Inc.), which itself is a program that runs on a computer's operating system. Due to the object oriented nature of Java and the standardization of JVMs, Java programs may provide "Write Once, Run Anywhere" (WORA) capabilities. Java applications that are downloaded to a mobile terminal can be referred to as MIDlets. Java is well known to those of skill in the computer art, and need not be described further herein.

FIG. 1 is a block diagram of a communication system that includes a Web server 130 that communicatively connects a Web application 118 on a personal computer 100 to a third party application MIDlet on a mobile terminal 120 in accordance with some embodiments. The personal computer 100 communicates with the Web server 130 through a data network (e.g., Internet and/or private data packet network), and the mobile terminal 120 communicates with the Web server 130 through a base station transceiver 140 and a data network (e.g. Internet and/or private data packet network). Referring to FIG. 1, the personal computer 100 can include a processor circuit 112, a data network interface 114, and a display device 116. The processor circuit 112 is configured to execute a Web browser 117 (resident in memory within or separate from the processor circuit 112) through which a user can download a Web application 118 from an Internet Website via the data network 116. For example, a user may operate the Web browser 117 to find a webpage for a Web application that has a connector applet that will enable the user to access (ruin/enter data into/view data output from) one or more applications on a separate mobile terminal.

The Web application 118 may display a user selectable link which indicates that a user may use the Web application 118 to gain access to one or more applications that reside on a mobile terminal. In response to a user selecting the link, the Web browser 117 is directed to download a connector applet 119 from the Web server 130. An "applet" is a program that is written in Java and can be included in an HTML page for downloading through a Web browser. Accordingly, the Web browser 117 may communicate with the Web server 130 using HTML, XML, and/or another communication protocol.

The Web server 130 can include a processor circuit 132, which is configured to execute a connector servlet 134 (resident in memory within or separate from the processor circuit 132) and a data network interface 136. The connector applet 119 is configured to forward data requests and data responses generated by the Web application 118 to the connector servlet 134 on the Web server 130 and, similarly, to forward data requests and the responses to the Web application 118 that the connector applet 119 receives from the connector servlet 134.

The mobile terminal 120 can include a processor circuit 122, a radio transceiver circuit 124, and a user interface 126. The processor circuit 122 is configured to execute a connector MIDlet 128 and a plurality of third party or other application MIDlets (e.g., MIDlet URI1 and MIDlet URI2), also referred to as local applications, that may reside in memory within or separate from the processor circuit 122. The MIDlets can be written in a Java application framework for the Mobile Information Device Profile (MIDP) and can be executed on a Java-enabled mobile terminal.

The application MIDlet URI1 may display a user selectable link on a display of the mobile terminal 120 which indicates that a user may access the application MIDlet URI1 through one or more Web applications that reside on a personal computer and/or to indicate that a user may access one or more of Web applications that reside on a personal computer through the application MIDlet URI1. In response to a user selecting the link, the application MIDlet URI1 is directed to download the connector MIDlet 128 from the Web server 130.

The connector MIDlet 128 is configured to forward data requests and data responses generated by one or more of the application MIDlets URI1 and URI2 to the connector servlet 134 on the Web server 130 and, similarly, to forward data requests and the responses to the one or more of the application MIDlets URI1 and URI that the connector MIDlet 128 receives from the connector servlet 134.

Accordingly, the connector servlet 134 on the Web server 130 provides a proxy connection between the connector applet 119 on the personal computer 100 and the connector MIDlet 128 on the mobile terminal 120. The connector servlet 134 on the Web server 130 can thereby communicatively connect the Web application 118 on the personal computer 100 to one or more of the application MIDlets URI1 and URI2 on the mobile terminal 120 so that data requests from/to the Web application 118 are forwarded to the corresponding application MIDlets URI1 and/or URI2 and data responses from/to the corresponding application MID lets URI1 and/or URI2 are forwarded to the Web application 118. A user may thereby use the Web application 118 on the personal computer 100 to operate, input data into, and view data generated by the application MIDlets URI1 and URI2 on the mobile terminal 120. In some embodiments, the Web application 118 may spawn separate windows within the Web browser 117 for each application on the mobile terminal 120. Thus, for example, the connector applet 119 and connector servlet 134 can be configured to communicatively connect the application MIDlet URI1 to a first Web application window within the Web browser 117 and to communicatively connect the other application MIDlet URI2 to a different second Web application window within the Web browser 117.

Figure 2:
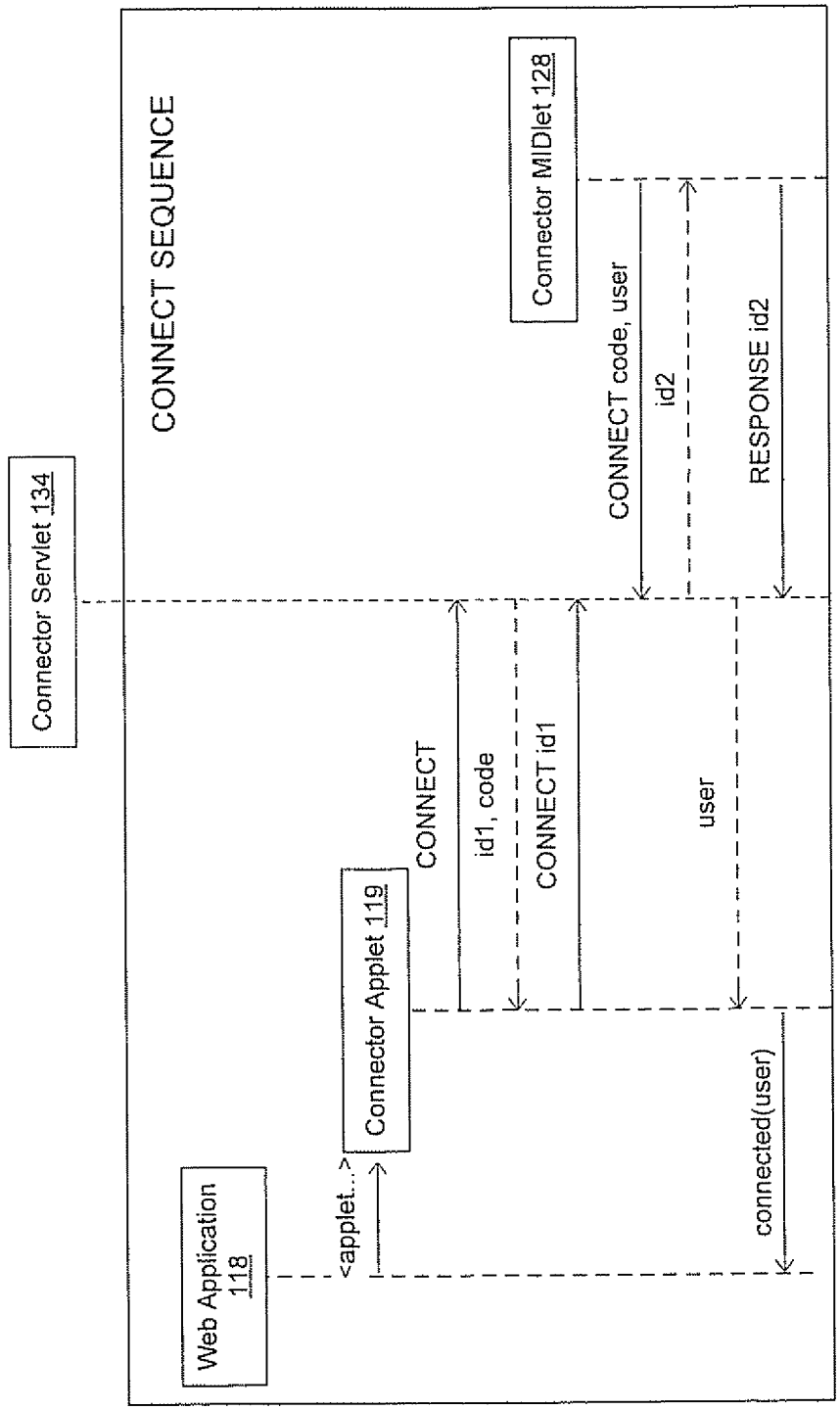
FIG. 2 is a data flow diagram and flowchart that illustrates operations and methods for communicatively connecting a connector application on the personal computer to a connector application on the mobile terminal in accordance with some embodiments.

FIG. 2 is a data flow diagram and flowchart that illustrates exemplary operations and methods for connecting the connector applet 119 on the personal computer 100 to the connector MIDlet and 28 on the mobile terminal 120 in accordance with some embodiments. The exemplary connection process may contain two stages; 1) the connector applet 119 on the personal computer 100 connecting to the connector servlet 134 on the Web server 130; and 2) the connector MIDlet 128 on the mobile terminal 120 connecting to the connector servlet 134 and the Web server 130.

Referring to FIGS. 1 and 2, a user may command the Web application 118 on the personal computer 100 to connect to the application MIDlet URI1 on the mobile terminal 120 so that the user can execute, input data to, and/or receive data from the application MIDlet URI1 through the Web application 118. The Web application 118 responds to the command by generating a connection request that is communicated to the connector applet 119. The connector applet 119 forwards the connection request to the connector servlet 134 on the Web server 130. The connector servlet 134 generates a first session ID "id1" and a corresponding first code which are communicated to the connector applet 119. The connector applet 119 responds thereto by forwarding the connection request with the first session ID to the connector servlet 134 to establish a connection between the connector applet 119 and the connector servlet 134. The connector applet 119 displays the first code on the display device 116 for viewing by the user.

The user can manually type or otherwise enter the first code, which is viewed on the display device 116, into the mobile terminal 120 through the user interface 126. The connector MIDlet 128 can receive the code entered by the user and respond thereto by communicating the entered code as a second code along with a user ID to the connector servlet 134 on the Web server 130. The connector servlet 134 compares the first code received from the connector applet 119 on the personal computer 100 to the second code received from the connector MIDlet 128 on the mobile terminal 120 and responds to a match therebetween by assigning a second session ID to the application MIDlet URI1 and communicating the second session ID to the connector MIDlet 128 on the mobile terminal 120 and by locally associating together the first session ID and the second session ID.

Figure 3:
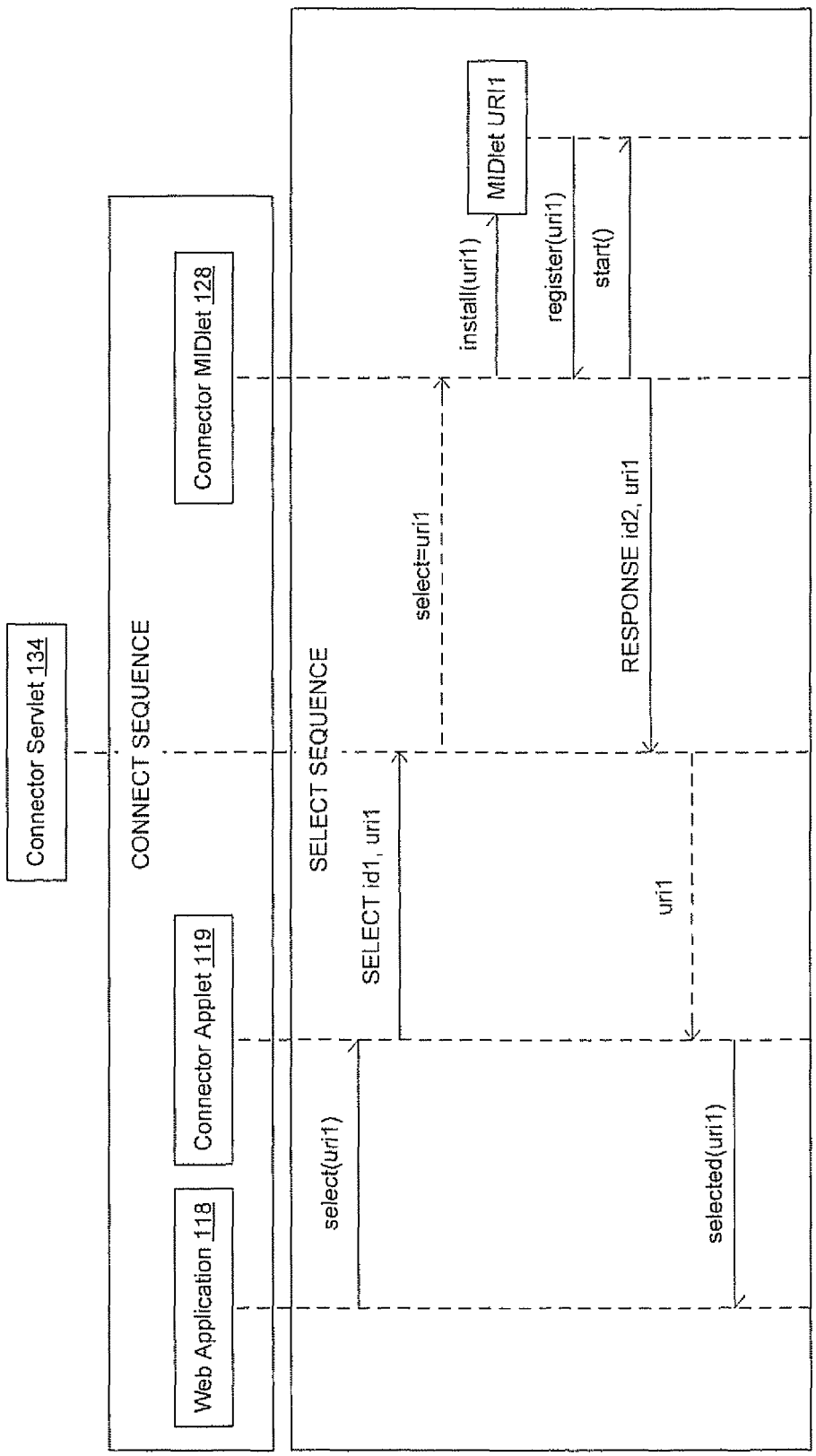
FIG. 3 is a data flow diagram and flowchart that illustrates operations and methods for communicatively connecting a Web application on the personal computer to a local application on the mobile terminal in accordance with some embodiments.

FIG. 3 is a data flow diagram and flowchart that illustrates operations and methods by which the Web application 118 selects an application (e.g., application MIDlet URI1) on the mobile terminal 120 that is to be communicatively connected to the Web application 119 through the communication pathways established through the connector applet 119, the connector servlet 134, and the connector MIDlet 128 in accordance with some embodiments. Referring to FIG. 3, the Web application 118 generates an application selection command, which identifies the particular application MIDlet URI1 it requests connection thereto, and communicates the application selection command to the connector applet 119. The connector applet 118 forwards the application selection command with the first session ID to the connector servlet 134. The connector servlet 134 responds by identifying the correlation of the first session ID to the second session ID and responding to that identification by forwarding the application selection command with the second session ID to the connector MIDlet 128.

The connector MIDlet 128 installs/activates the identified application MIDlet URI1 for execution by the processor circuit 122. The connector MIDlet 128 may further carry out a registration process for the application MIDlet URI1 to confirm that any application licenses or other pre-execution constraints are satisfied before installing/activating the application MIDlet URI1 for execution.

Upon installing/activating the application MIDlet URI1, the connector MIDlet 128 communicates a response to the connector servlet 134 that identifies that the application MIDlet URI1 has been installed/activated and identifies the second session ID. The connector servlet 134 responds thereto by forwarding a corresponding response with the first session ID to the connector applet 119, which then signals to the Web application 118 that the selected application MIDlet URI1 has been installed/activated and is, therefore, ready to receive data requests and/or data responses.

Figure 4:
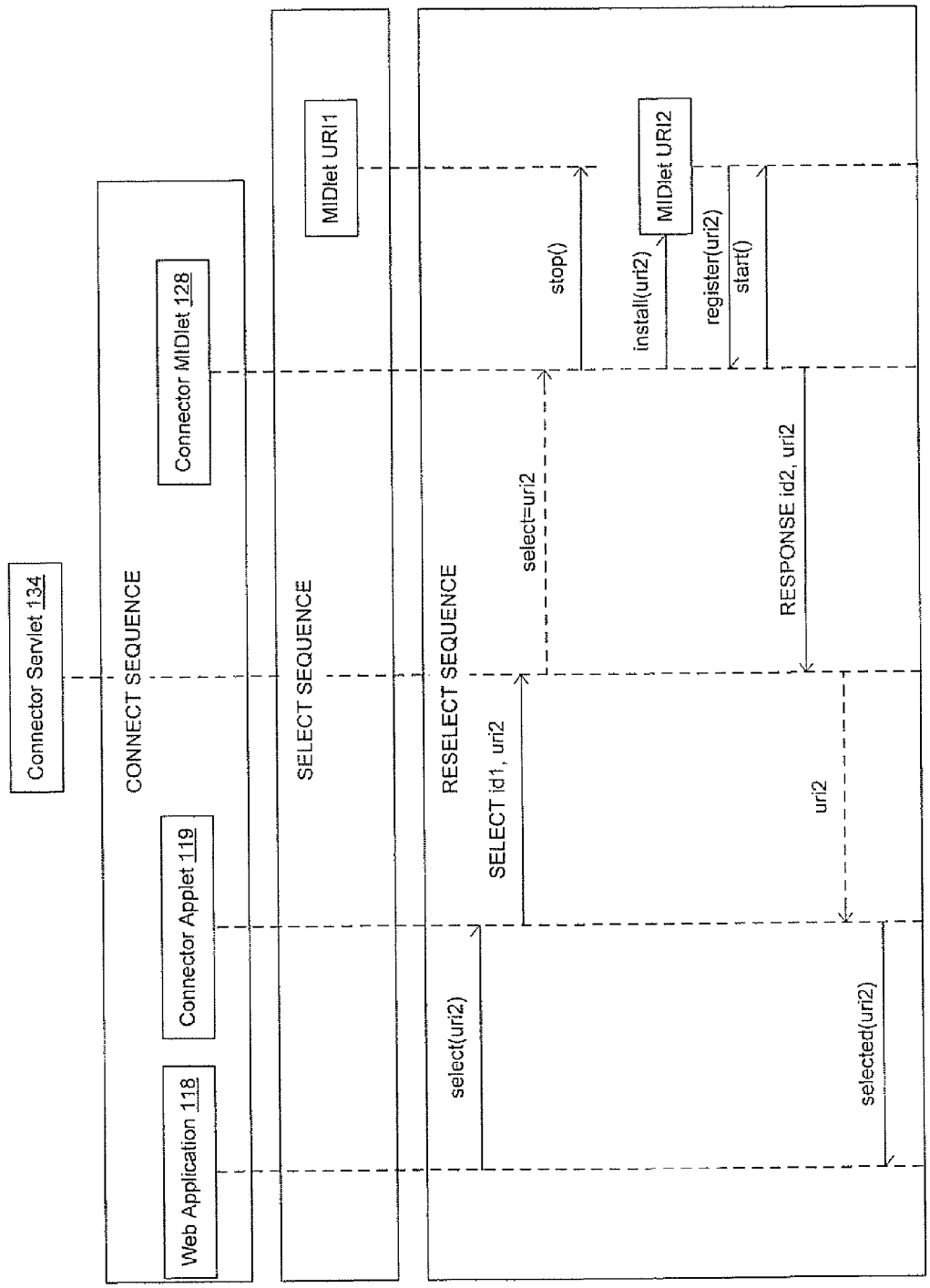
FIG. 4 is a data flow diagram and flowchart that illustrates operations and methods by which the Web application connects through the Web server to a first application MIDlet on the mobile terminal, disconnects therefrom, and then connects to a second application MIDlet on the mobile terminal in accordance with some embodiments.

FIG. 4 is a data flow diagram and flowchart that illustrates operations and methods by which the Web application 118 connects through the Web server 130 to a first application MIDlet URI1 on the mobile terminal 120, disconnects therefrom, and then connects to a second application MIDlet URI2 on the mobile terminal 120 in accordance with some embodiments. After the connection sequence of FIG. 2 and the selection sequence of FIG. 3 are carried out, the Web application 118 is communicatively connected through the Web server 130 to the first application MIDlet URI1 on the mobile terminal 120. The other application 118 may then disconnect from the first application MIDlet URI1 and reselect a second application MIDlet URI1 on the mobile terminal 120 for communication connection thereto.

The Web application 118 generates an application reselection command, which identifies the second application MIDlet URI2 it requests connection to, and communicates the application selection command to the connector applet 119. The connector applet 118 forwards the application reselection command with the first session ID to the connector servlet 134. The connector servlet 134 responds by identifying the correlation of the first session ID to the second session ID and responding to that identification by forwarding the application reselection command with the second session ID to the connector MIDlet 128.

Figure 5:
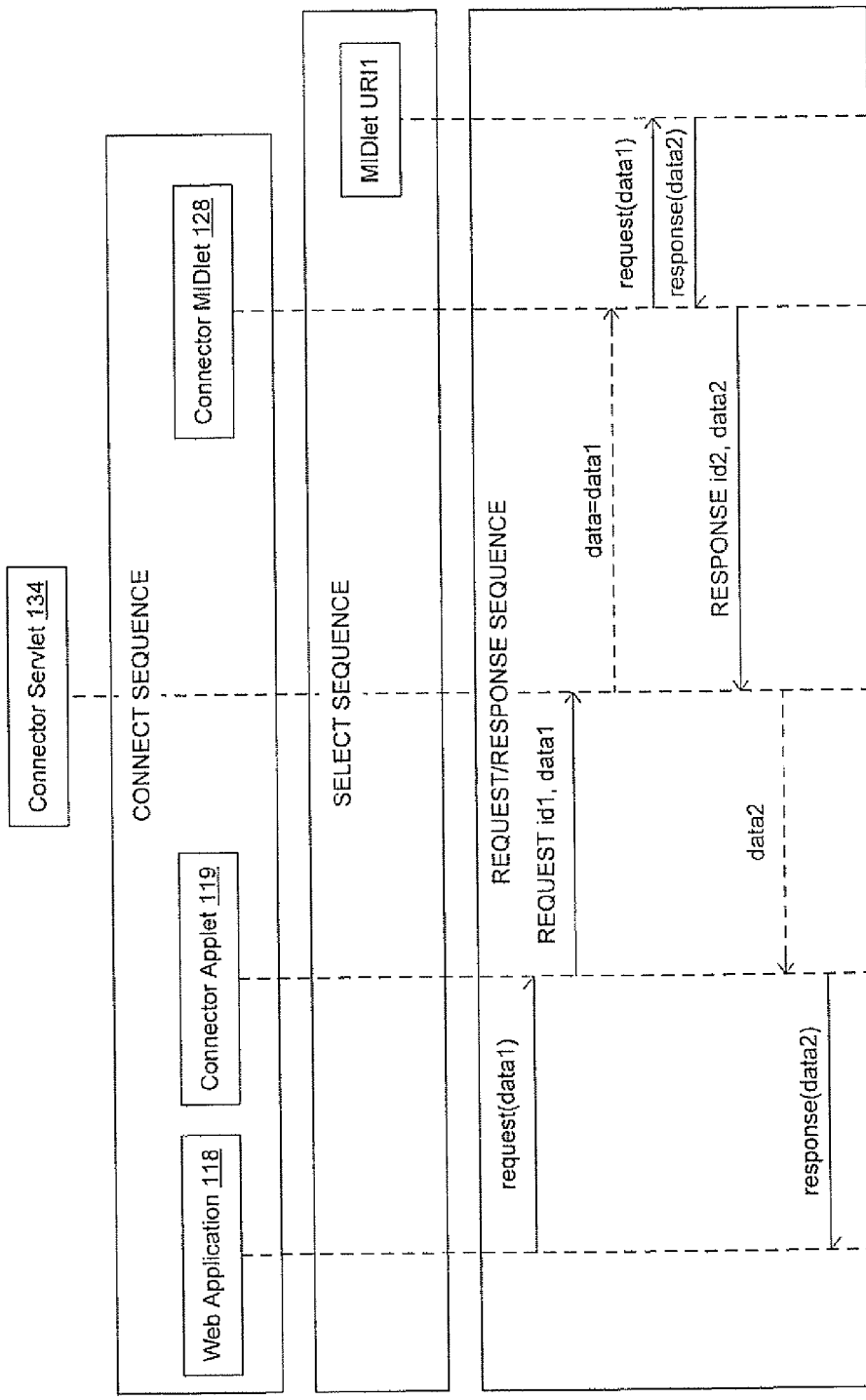
FIG. 5 is a data flow diagram and flowchart that illustrates operations and methods by which the Web server forwards data requests and responses from the Web application on the personal computer to the application MIDlet on the mobile terminal and vice versa in accordance with some embodiments.

The connector MIDlet 128 deinstalls/stops execution of the first application MIDlet URI1, and then installs/activates the identified second application MIDlet URI2 for execution by the processor circuit 122. The connector MIDlet 128 may further carry out a registration process for the second application MIDlet URI2 to confirm that any application licenses or other pre-execution constraints are satisfied before installing/activating the second application MIDlet URI2 for execution Upon installing/activating the second application MIDlet URI2, the connector MIDlet 128 communicates a response to the connector servlet 134 that identifies that the second application MIDlet URI2 has been installed/activated and identifies the second session ID. The connector servlet 134 responds thereto by forwarding a corresponding response with the first session ID to the connector applet 119, which then signals to the Web application 118 that the selected second application MIDlet URI2 has been installed/activated and is, therefore, ready to receive data requests and/or data responses FIG. 5 is a data flow diagram and flowchart that illustrates operations and methods by which the connector servlet 134 on the Web server 130 forwards data requests and responses from the Web application 118 on the personal computer 100 to the application MIDlet 128 on the mobile terminal 120 and vice versa in accordance with some embodiments. After completion of the connection sequence of FIG. 2 and the selection sequence of FIG. 3, the Web application 118 and the application MIDlet URI1 may thereafter communicate through the connector servlet 134 and the Web server 132 until the connector servlet 134 is commanded to disconnect through, for example one or more of the processes that are described further below.

Referring to FIG. 5, while operating to provide communication connectivity, the connector servlet 134 responds to data requests and/or data responses that are received in communications containing the second session ID from the connector MIDlet 128 on the mobile terminal 120 by forwarding the received data requests and/or data responses with the first session ID to the connector applet 119 on the personal computer 100 and, similarly, responds to data requests and/or data responses that are received in communications containing the first session ID from the connector applet 119 on the personal computer 100 by forwarding the received data requests and/or data responses with the second session ID to the connector MIDlet 128 on the mobile terminal 120.

In particular, as shown in FIG. 5, the Web application 118 can generate a first data request ("data1") that is communicated to the connector applet 119. The connector applet 119 responds by forwarding the first data request with the first session ID to the connector servlet 134. The connector servlet 134 responds thereto by identifying the correlation of the first session ID to the second session ID and responding to that identification by forwarding the first data request with the second session ID to the connector MIDlet 128 on the mobile terminal 120. The connector MIDlet 128 responds thereto by forwarding the data request to the application MIDlet URI1.

The application MIDlet URI1 can respond thereto by generating a first data response ("data2") that is communicated to the connector MIDlet 128, which forwards the first data response with the second session ID to the connector servlet 134. The connector servlet 134 responds thereto by identifying the correlation of the second session ID to the first session ID and responding to that identification by forwarding the first data response with the first session ID to the connector applet 119 on the personal computer 100. The connector applet 119 forwards the first data response to the Web application 118.

In a similar process, the MIDlet URI1 can generate a second data request that is communicated to the connector MIDlet 128. The connector MIDlet 128 responds thereto by forwarding the second data request with the second session ID to the connector servlet 134. The connector servlet 134 responds thereto by identifying the correlation of the second session ID to the first session ID and responding to that identification by forwarding the second data request with the first session ID to the connector applet 119 on the personal computer 100. The connector applet 119 responds thereto by forwarding the second data request to the Web application 118. The Web application 118 can respond thereto by generating a second data response that is communicated to the connector applet 119, which forwards the second data response with the first session ID to the connector servlet 134. The connector servlet 134 responds thereto by identifying the correlation of the first session ID to the second session ID and responding to that identification by forwarding the second data response with the second session ID to the connector MIDlet 128 on the mobile terminal 120. The connector MIDlet 128 forwards the second data response to the MIDlet URI1.

Figure 6:
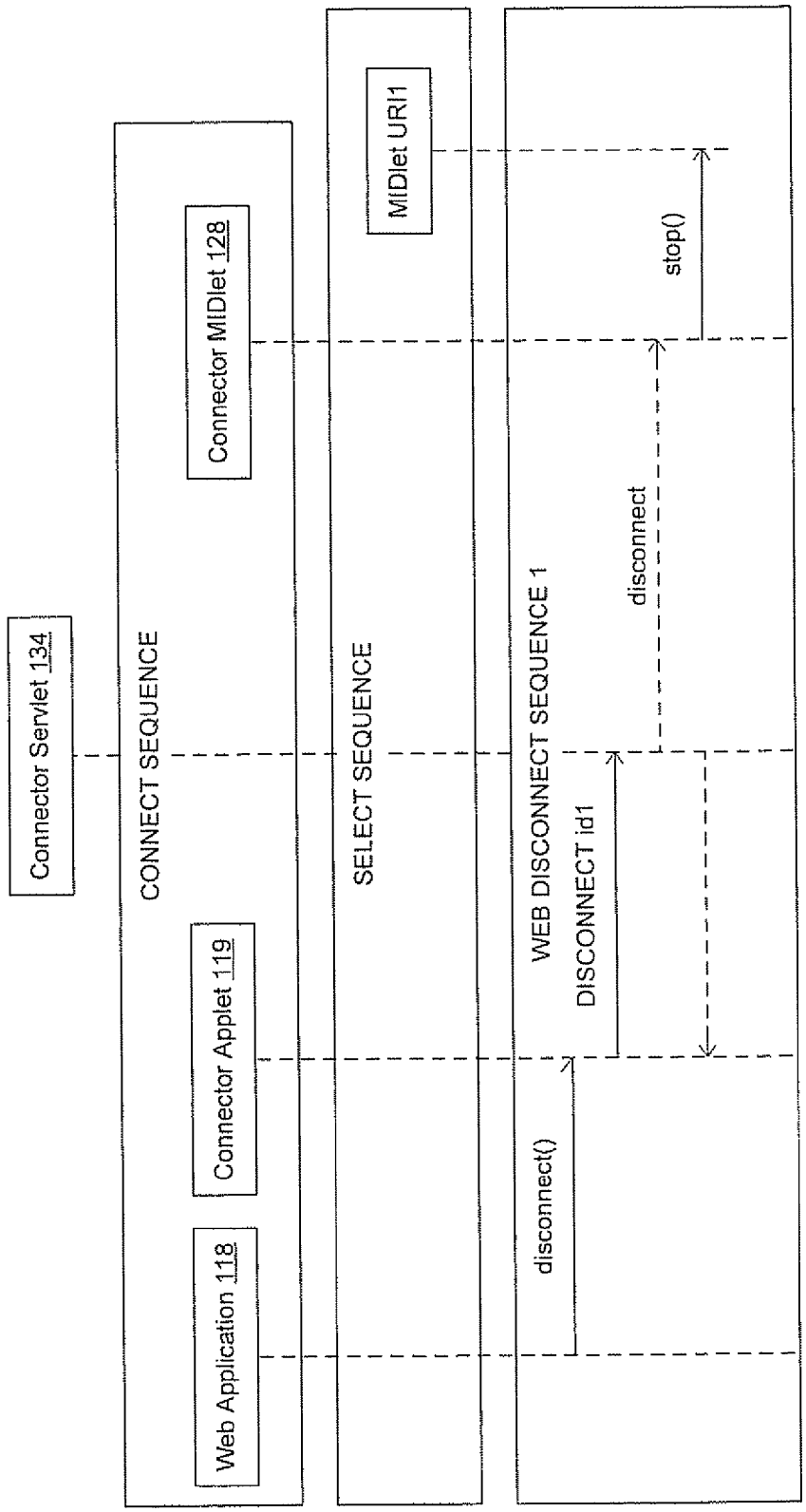
FIG. 6 is a data flow diagram and flowchart that illustrates operations and methods by which the Web application causes the Web server to communicatively disconnect the Web application from the application MIDlet in response to a timeout between communications (silence) in accordance with some embodiments.

FIG. 6 is a data flow diagram and flowchart that illustrates operations and methods by which the Web application 118 causes the connector servlet 134 on the Web server 130 to communicatively disconnect the Web application 118 from the application MIDlet URI1 in response to a timeout between communications (silence) in accordance with some embodiments. After completion of the connection sequence of FIG. 2 and the selection sequence of FIG. 3, the Web application 118 and the application MIDlet URI1 can communicate therebetween through the connector servlet 134. Referring to FIG. 6, the Web application 118 may respond to expiration of a threshold elapsed time since it received a data request from the application MIDlet URI1 and/or respond to another event, such as a defined user command, by discontinuing its communication connection to the application MIDlet URI1 by communicating a disconnect message to the connector applet 119. The connector applet 119 forwards the disconnect message with the first session ID to the connector servlet 134. The connector servlet 134 forwards the disconnect message with the second session ID to the connector MIDlet 128, which triggers the MIDlet URI1 to stop executing and/or to be deinstalled.

Figure 7:
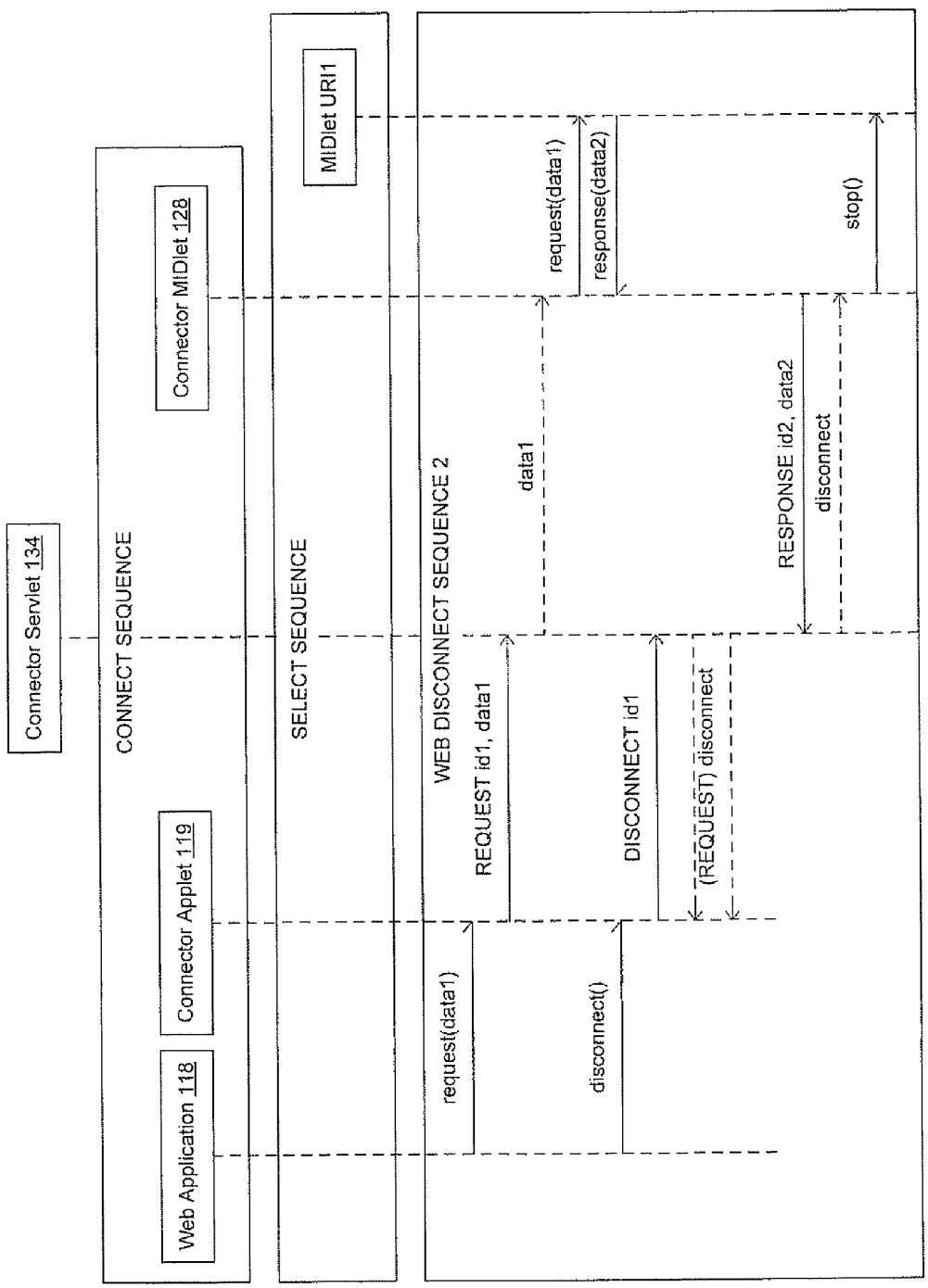
FIG. 7 is a data flow diagram and flowchart that illustrates operations and methods by which the Web application causes the Web server to communicatively disconnect the Web application from the application MIDlet in response to unresponsiveness from the application MIDlet to a data request from the Web application in accordance with some embodiments.

FIG. 7 is a data flow diagram and flowchart that illustrates operations and methods by which the Web application 118 causes the Web server 130 to communicatively disconnect the Web application making from the application MIDlet URI1 in response to unresponsiveness from the application MID let URI1 to a data request from the Web application 118 in accordance with some embodiments. After completion of the connection sequence of FIG. 2 and the selection sequence of FIG. 3, the Web application 118 and the application MIDlet URI1 can communicate therebetween through the connector servlet 134. Referring to FIG. 7, the Web application 118 communicates a data request through the connector applet 119, the connector servlet 134, and the connector MIDlet 128 to the application MIDlet URI1. However, the Web application 118 may respond to a defined user command (e.g. received through the Web application 118) and/or respond to a determination that a threshold elapsed time has expired since when the data request was communicated toward the application MIDlet URI1 and no corresponding data response has been received from the application MIDlet URI1 by discontinuing its connection to the application MIDlet URI1. The Web application 118 communicates a disconnect message to the connector applet 119, which forwards the disconnect message and the first session ID to the connector servlet 134. The connector servlet 134 responds thereto by removing the local association between the first session ID and the second session ID and ceasing to communicatively connect the Web application 118 on the personal computer 100 to the application MIDlet URI1 on the mobile terminal 120.

The application MIDlet URI1 may subsequently generate a data response that is communicated to the connector MIDlet 128, which forwards the data response and the second session ID to the connector servlet 134. The connector servlet 134 identifies that there is no local correlation between the second session ID in any other session ID and responds thereto by communicating a disconnect message to the connector MIDlet 128, which triggers the application MIDlet URI1 to stop executing and/or to be deinstalled.

Figure 8:
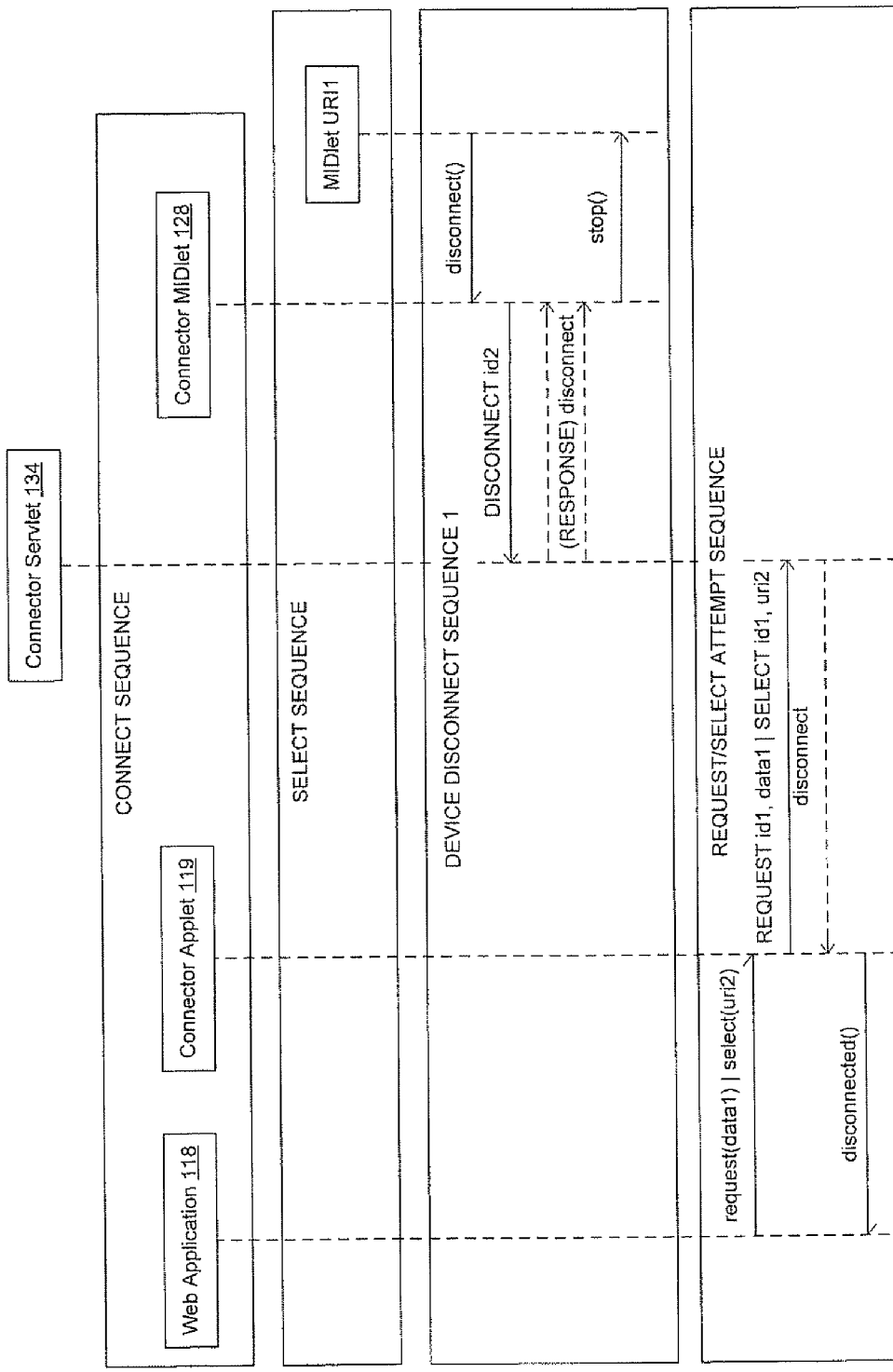
FIG. 8 is a data flow diagram and flowchart that illustrates operations and methods by which the application MIDlet on the mobile terminal causes the Web server to communicatively disconnect the application MIDlet from the Web application on the personal computer in response to unresponsiveness from the Web application to a data request from the application MIDlet in accordance with some embodiments.

FIG. 8 is a data flow diagram and flowchart that illustrates operations and methods by which the application MIDlet URI1 on the mobile terminal 120 causes the connector servlet 134 on the Web server 130 to communicatively disconnect the application MIDlet URI1 from the Web application 118 on the personal computer 100 in response to unresponsiveness from the Web application 118 to a data request from the application MIDlet URI1 in accordance with some embodiments. After completion of the connection sequence of FIG. 2 and the selection sequence of FIG. 3, the Web application 118 and the application MIDlet URI1 can communicate therebetween through the connector servlet 134. Referring to FIG. 8, the application MDIlet URI1 communicates a disconnect message (e.g. responsive to a user command and/or shut-down of the application MIDlet URI1) to the connector MIDlet 128 which forwards the disconnect message and the second session ID to the connector servlet 134. The connector servlet 134 responds thereto by removing the local association between the second session ID and the first session ID and ceasing to communicatively connect the Web application 118 on the personal computer 100 to the application MIDlet URI1 on the mobile terminal 120.

The Web application 118 may subsequently generate a data request that is communicated to the connector applet 119, which forwards the data request and the first session ID to the connector servlet 134. The connector servlet 134 identifies that there is no local correlation between the first session ID in any other session ID and responds thereto by communicating a disconnect message to the connector applet 119, which signals the Web application 118 that is communicatively disconnected from the application MIDlet URI1.

Figure 9:
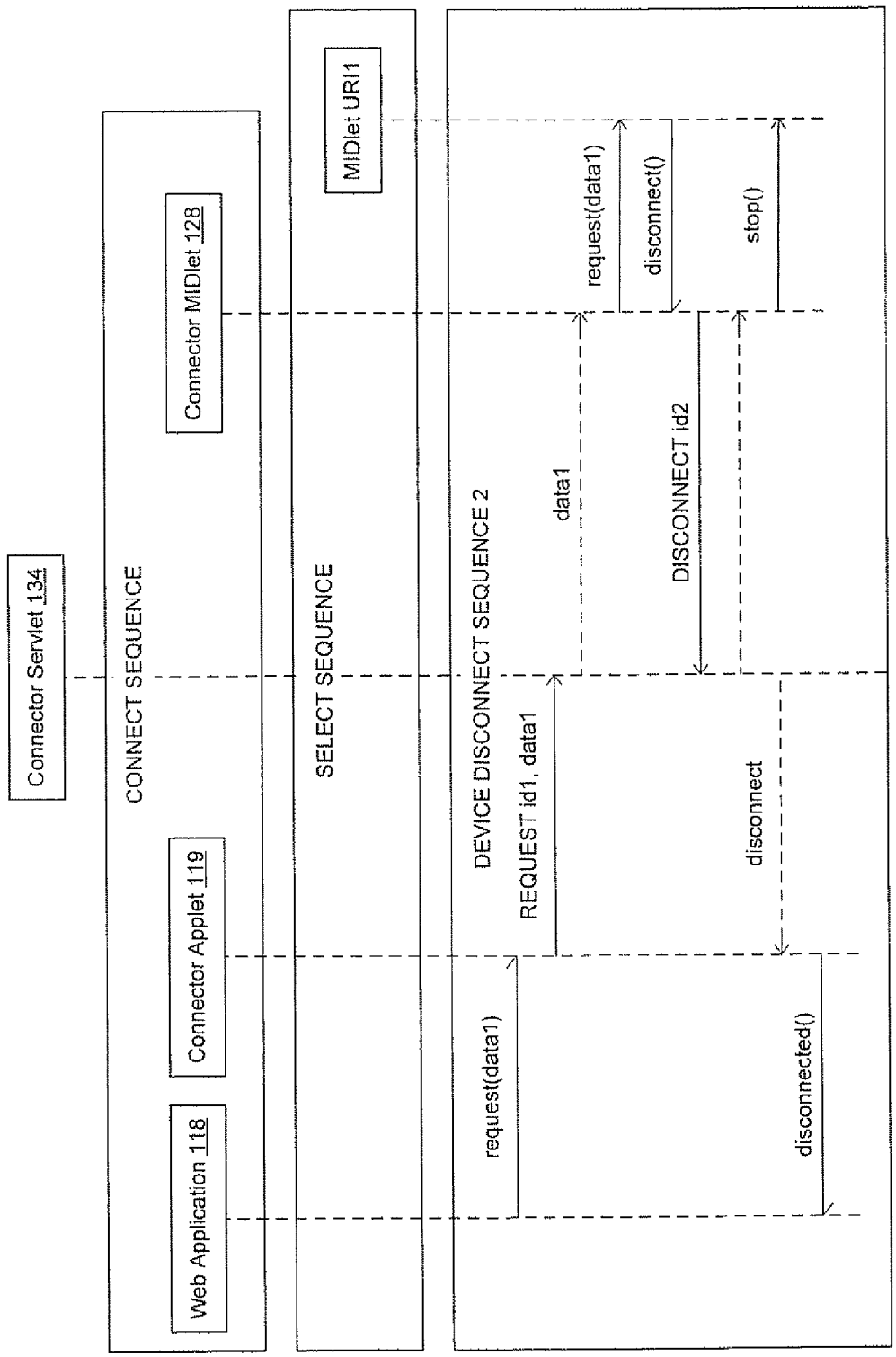
FIG. 9 is a data flow diagram and flowchart that illustrates operations and methods by which the application MIDlet on the mobile terminal causes the Web server to communicatively disconnect the application MIDlet from the Web application on the personal computer in response to unresponsiveness from the Web application to a data request from the application MIDlet in accordance with some embodiments.

FIG. 9 is a data flow diagram and flowchart that illustrates operations and methods by which the application MIDlet URI1 on the mobile terminal 120 causes the Web server 130 to communicatively disconnect the application MIDlet URI1 from the Web application 118 on the personal computer and 20 in response to unresponsiveness from the Web application 118 to a data request from the application MIDlet URI1 in accordance with some embodiments. After completion of the connection sequence of FIG. 2 and the selection sequence of FIG. 3, the Web application 118 and the application MIDlet URI1 can communicate therebetween through the connector servlet 134. Referring to FIG. 9, the Web application 118 communicates a data request through the connector applet 119, the connector servlet 134, and the connector MIDlet 128 to the application MIDlet URI1. However, the application MIDlet URI1 communicates a disconnect message (e.g. responsive to a user command and/or shut-down of the application MID let URI1) to the connector MIDlet 128 which forwards the disconnect message and the second session ID to the connector servlet 134. The connector servlet 134 responds thereto by removing the local association between the second session ID and the first session ID and ceasing to communicatively connect the Web application 118 on the personal computer 100 to the application MIDlet URI1 on the mobile terminal 120.

The connector servlet 134 may send a confirmation message back to the connector MIDlet 128 which may triggers the application MIDlet URI1 to stop executing and/or to be deinstalled. The connector servlet 134 may send a disconnect message to the connector applet 119, which may forward the disconnect message to the Web application 118 to signal that the Web application 118 is disconnected from the application MIDlet URI1.

Although FIGS. 1-9 illustrate an exemplary communication system and associated operations and methods that may be carried out by components therein, it will be understood that the present invention is not limited to such configuration, but is intended to encompass any configuration capable of carrying out at least some of the operations and methods described herein. The radio transceiver circuit 124 and the mobile terminal 120 may be configured to communicate according to one or more cellular protocols, which may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The wireless terminal 120 may include, but is not limited to a cellular phone, a cellular data terminal, an electronic gaming terminal, and/or desktop/laptop/palmtop/tablet computer with communication circuitry. The wireless terminal 120 may include, without limitation, additional functionality that provides Internet/intranet access and browser capabilities, wireless voice communication (e.g., Voice Over Internet Protocol), wireless email, wireless messaging, videoconferencing communication capabilities, and/or Personal Data Assistant capabilities (e.g., contact information management, task management, and/or schedule management). The personal computer 100 may be any data processing apparatus, including, but not limited to, a desktop/laptop/palmtop/tablet computer, that is configured to be provide a Web browser through which a user can access through a data network one or more applications on a mobile terminal.

Various embodiments of the present invention have been described in part above with reference to the system, data flow diagram, and flowchart illustrations of apparatus, operations, methods, and computer program products. It should also be noted that in other implementations, the function(s) noted in the illustrations may occur out of the order noted in the figures. For example, two blocks/steps shown in succession may, in fact, be executed substantially concurrently or the blocks/steps may sometimes be executed in the reverse order, depending on the functionality involved. Moreover, the functionality of an illustrated block/step may be separated into multiple blocks/steps and/or the functionality of two or more blocks/steps may be at least partially integrated. It will be understood that each block/steps of the figures and combinations of blocks/steps in the figures can be implemented by computer program instructions. These computer program instructions (also referred to as applications) may be provided to a processor circuit (which may be a general purpose computer, special purpose computer, or other programmable data processing apparatus) to produce a machine, such that the instructions, which execute via the processor circuit, create means for implementing the functions/acts specified in the figures. Accordingly, as used herein the phrases "the application . . . is operated" and "the application . . . operates" refers to the application being executed by a processor circuit to carry out the functionality that is described for the application.

In the figures and specification, there have been disclosed embodiments of the invention and, although specific terms are employed, they are used in a generic and descriptive sense only and not for purposes of limitation, the scope of the invention being set forth in the following claims.

What is claimed is:

1. A method of communicatively connecting a local application on a mobile terminal to a Web application on a personal computer, the method comprising:

communicating a first session ID for the Web application and a corresponding first code from a connector application on a Web server to the personal computer in response to a connection request from the personal computer, wherein communicating the first session ID for the Web application and the corresponding first code from the connector application on a Web server to the personal computer comprises responding to a user selection, via the personal computer, of a connector application that is associated with the Web application by operating the personal computer to request communication of the first session ID and the first code from the connector application on the Web server and to display the received first code to a user;

communicating a second code and user ID from the mobile terminal to the connector application on the Web server, wherein communicating the second code and user ID from the mobile terminal to the connector application on the Web server comprises operating a connector application on the mobile terminal to receive the first code manually entered by the user through a user interface on the mobile terminal and to respond thereto by communicating the code entered by the user as the second code along with the user ID to the connector application on the Web server;

operating the connector application on the Web server to determine whether the first code matches the second code from the mobile terminal and, if so, communicatively connecting the local application on the mobile terminal to the Web application on the personal computer;

operating the connector application on the Web server to respond to its determination that the first code matches the second code from the mobile terminal by assigning and communicating a second session ID to the local application on the mobile terminal and by locally associating together the first session ID and the second session ID; and operating the connector application on the Web server to respond to a data request and/or a data response received from the personal computer that contains the first session ID by identifying the correlation of the first session ID to the second session ID and by responding to the identification by forwarding the received data request and/or data response to the local application on the mobile terminal;

wherein communicatively connecting the local application on the mobile terminal to the Web application on the personal computer comprises operating the connector application on the Web server to forward data requests and data responses that are received from the Web application on the personal computer to the local application on the mobile terminal and to forward data requests and data responses that are received from the local application on the mobile terminal to the Web application on the personal computer.

2. The method of claim 1, wherein: communicatively connecting the local application on the mobile terminal to the Web application on the personal computer further comprises operating a connector application on the personal computer to forward data requests and data responses generated by the Web application on the personal computer to the connector application on the Web server and operating a connector application on the mobile terminal to forward data requests and data responses generated by the local application on the mobile terminal to the connector application on the Web server.

3. The method of claim 1, further comprising:

operating the connector application on the personal computer to respond to a first data request from the Web application by communicating the first data request and the first session ID, which identifies a source of the first data request, to the connector application on the Web server;

operating the connector application on the Web server to respond to the first data request and the first session ID received from the personal computer by identifying the correlation of the first session ID to the second session ID and by responding to the identification by forwarding the first data request and the second session ID to the mobile terminal; and operating the connector application on the mobile terminal to respond to the first data request and the second session ID received from the Web server by communicating the first data request to the local application.

4. The method of claim 3, further comprising:

operating the connector application on the mobile terminal to respond to a first data response from the local application, which is generated in response to the first data request, by communicating the first data response and the second session ID, which identifies a source of the first data response, to the Web server;

operating the connector application on the Web server to respond to the first data response and the second session ID received from the mobile terminal by identifying the correlation of the second session ID to the first session ID and by responding to the identification by forwarding the first data response and the first session ID to the personal computer; and operating the connector application on the personal computer to respond to the first data response and the first session ID received from the Web server by communicating the first data response to the Web application.

5. The method of claim 3, further comprising:

responding to expiration of a threshold elapsed time since when the first data request and the first session ID were forwarded from the personal computer to the Web server and no corresponding data response has been received from the mobile terminal by forwarding a disconnect message and the first session ID to the Web server; and operating the connector application on the Web server to respond to the disconnect message and the first session ID from the personal computer by removing the local association between the first session ID and the second session ID and ceasing to communicatively connect the local application on the mobile terminal to the Web application on the personal computer.

6. The method of claim 1, further comprising:

operating the connector application on the mobile terminal to respond to a second data request from the local application by communicating the second data request and the second session ID, which identifies a source of the second data request, to the connector application on the Web server;

operating the connector application on the Web server to respond to the second data request and the second session ID received from the mobile terminal by identifying the correlation of the second session ID to the first session ID and by responding to the identification by forwarding the second data request and the first session ID to the personal computer; and operating the connector application on the personal computer to respond to the second data request and the first session ID received from the Web server by communicating the second data request to the Web application.

7. The method of claim 6, further comprising:

operating the connector application on the personal computer to respond to a second data response from the Web application, which is generated in response to the second data request, by communicating the second data response and the first session ID, which identifies a source of the second data response, to the Web server;

operating the connector application on the Web server to respond to the second data response and the first session ID received from the personal computer by identifying the correlation of the first session ID to the second session ID and by responding to the identification by forwarding the second data response and the second session ID to the mobile terminal; and operating the connector application on the mobile terminal to respond to the second data response and second session ID received from the Web server by communicating the second data response to the local application.

8. The method of claim 6,
further comprising:
responding to expiration of a threshold elapsed time since when the second data request and the second session ID were forwarded from the mobile terminal to the Web server and no corresponding data response has been received from the personal computer by forwarding a disconnect message and the second session ID to the Web server; and operating the connector application on the Web server to respond to the disconnect message and the second session ID from the mobile terminal by removing the local association between the first session ID and the second session ID and ceasing to communicatively connect the local application on the mobile terminal to the Web application on the personal computer.

9. The method of claim 1,
further comprising:
responding to a user selection through the personal computer of a connector application link that is displayed by the Web application by downloading a connector application from the Web server and initiating execution of the downloaded connector application; and operating the connector application on the personal computer to request communication of the first session ID and the first code from the connector application on the Web server and to display the received first code to a user.

10. The method of claim 1,
further comprising:
responding to a user selection through the mobile terminal of a connector application link that is displayed by the local application by downloading a connector application from the Web server and initiating execution of the downloaded connector application; and operating the connector application on the mobile terminal to receive the first code manually entered by the user through a user interface on the mobile terminal and to respond thereto by communicating the code entered by the user as the second code along with the user ID to the connector application on the Web server.

11. The method of claim 1,
wherein:
the first session ID for the Web application and the corresponding first code are communicated together from the connector application on the Web server to the personal computer.

12. The method of claim 1,
wherein:
the second code and user ill are communicated together from the mobile terminal to the connector application on the Web server.

13. A Web server comprising:
a data network interface; and
a processor circuit that executes a connector application configured to generate a first code and a first session ID for a Web application on a personal computer, to communicate the first code and the first session ID through the data network interface to the personal computer, to receive through the data network interface a second code from a mobile terminal, to determine whether the first code matches the second code and, if so, to forward communications received from a local application on the mobile terminal to the Web application on the personal computer and to forward communications received from the local application on the mobile terminal to the Web application on the personal computer;

wherein the processor circuit is further configured to respond to the determination that the first code matches the second code from the mobile terminal by assigning and communicating a second session ID to the local application on the mobile terminal, by locally associating together the first session ID and the second session ID, and by responding to a data request and/or a data response received from the personal computer that contains the first session ID by identifying the correlation of the first session ID to the second session ID and by responding to the identification by forwarding the data request and/or the data response to the local application on the mobile terminal; and wherein the processor circuit is further configured to respond to the determination that the first code matches the second code from the mobile terminal by assigning and communicating a second session ID to the local application on the mobile terminal, by locally associating together the first session ID and the second session ID, and by responding to a data request and/or a data response received from the mobile terminal that contains the second session ID by identifying the correlation of the second session ID to the first session ID and by responding to the identification by forwarding the data request and/or the data response to the Web application on the personal computer.

14. A mobile terminal comprising:
a radio transceiver circuit that is configured to communicate with a Web server via a base station transceiver;
a user input interface; and
a processor circuit that is configured to execute a connector application to receive a code that is manually entered by a user through the user input interface and to respond thereto by communicating the code along with a user ID to a connector application on the Web server, to respond to a data request and a session ID received from the Web server by outputting the data request to a local application that is executed by the processor, and to respond to receipt of a data response from the local application by outputting the data response and the session ID to the Web server for forwarding to a Web application on a personal computer;

wherein the local application executed by the processor circuit is further configured to display a user selectable link for causing connection to the Web application on the personal computer, and to respond to user selection of the link by downloading the connector application from the Web server and by causing execution of the downloaded connector application to initiate communication connectivity between the local application and the Web application through the Web server;

wherein the connector application is further configured to respond to expiration of a threshold elapsed time since when the connector application communicated a data request and the session ID to the Web server and no corresponding data response has been received from the personal computer by then communicating a disconnect message to the Web server to cause the Web server to cease communicatively connecting the local application on the mobile terminal to the Web application on the personal computer.

* * * * *